United States Patent [19]

Katsumi et al.

US005741508A

[11] Patent Number: 5,741,508
[45] Date of Patent: Apr. 21, 1998

[54] FEED FOR LIVESTOCK AND POULTRY AND A METHOD FOR IMPROVING MEAT AND FAT OBTAINABLE FROM LIVESTOCK AND POULTRY USING THE SAME

[75] Inventors: Ikuo Katsumi, Kobe; Yoshihide Fuse, Himeji; Taizo Kawabe, Takasago; Naoko Yasuhara, Aioi; Yoji Hisada, Kobe, all of Japan

[73] Assignee: Kanegafuchi Kagaku Kogyo Kabushiki Kaisha, Osaka, Japan

[21] Appl. No.: 567,850

[22] Filed: Dec. 6, 1995

Related U.S. Application Data

[63] Continuation of Ser. No. 278,039, Jul. 20, 1994, abandoned.

[30] Foreign Application Priority Data

Jul. 21, 1993 [JP] Japan ................. 5-179509
Jul. 21, 1993 [JP] Japan ................. 5-179510
Jul. 4, 1994 [JP] Japan ................. 6-152332

[51] Int. Cl.$^6$ ................. A23K 1/16; A23K 1/18
[52] U.S. Cl. ................. 424/442; 426/2; 426/623; 426/630; 426/635; 426/807; 426/648; 424/195.1; 514/783
[58] Field of Search ................. 424/439, 442, 424/195.1; 426/2, 623, 630, 635, 807, 648; 514/783

[56] References Cited

U.S. PATENT DOCUMENTS 4,197,294  4/1980  Klein ................. 424/195
4,880,639  11/1989  Lauermann et al. ................. 426/2

FOREIGN PATENT DOCUMENTS

1054175 A  9/1991  China .

OTHER PUBLICATIONS

Wang, Zhuanjing. *Chemical Abstracts*, vol. 116, #127385.

*Primary Examiner*—Edward J. Webman
*Attorney, Agent, or Firm*—Armstrong, Westerman, Hattori, McLeland & Naughton

[57] ABSTRACT

Livestock and poultry are fed with feed containing at least one spice chosen from among the families Myristicaceae, Cruciferae, Rutaceae, Compositae, Pedaliaceae, Piperaceae, Leguminosae, Umbelliferae, Myrtaceae, Solanaceae, Labiatae, Lauraceae, Liliaceae and Zingiberaceae, whereby the active ingredients of the spice taken into the bodies of the thus-fed livestock and poultry are transferred to their internal fat thereby to modify their meat and to improve the smell of their fat. Accordingly, the fatty smell of the meat and fat to be obtained from the thus-fed livestock and poultry is removed and the freshness-keeping power of the meat and fat is enhanced. As the spices may be added to feed, livestock and poultry may efficiently take the spices with ease.

6 Claims, No Drawings

5,741,508

FEED FOR LIVESTOCK AND POULTRY AND A METHOD FOR IMPROVING MEAT AND FAT OBTAINABLE FROM LIVESTOCK AND POULTRY USING THE SAME

This application is a Continuation of application Ser. No. 08/278,039, filed on Jul. 20, 1994 now abandoned.

BACKGROUND OF THE INVENTION 1. (Field of the Invention)

The object of the present invention is to provide feed for livestock and poultry, from which meat and fat are desired to be obtained, and also to provide a method of feeding livestock and poultry with such feed so as to improve meat and fat to be obtained from them, in order that meat and fat to be obtainable from livestock and poultry are modified to have an improved power against oxidation, an improved power for retarding the elevation of their acid values and an improved power for keeping their freshness with the result that the freshness of the thus-modified meat and fat lasts long, that the quality, such as the smell and the taste, of the thus-modified meat is improved and that the quality of the thus-modified fat is improved.

2. (Description of the Prior Art)

The amount of consumption of meats of livestock and poultry, such as pork and chicken, as fried meats, fried chickens, etc. is noticeably increasing in these days in the field of dining-out industry, etc. On the other hand, however, meats of livestock and poultry, especially their fats are easily oxidized and, in addition, their acid values are easily elevated to often detract from their taste. Further, it is difficult to keep their freshness, they often begin to smell, and their taste is often lowered. Therefore, some improvements in the method of storing them in refrigerators, etc. have heretofore been attempted but are not still satisfactory. At present, there is known no method for effectively enhancing the freshness-keeping power of meats of livestock and poultry themselves. Not only the above-mentioned meats of livestock and poultry but also their fats themselves are used variously, and the latter also have the same problems as those of the former.

BRIEF SUMMARY OF THE INVENTION

In consideration of the above-mentioned points, the present invention is to provide a means for enhancing the freshness-keeping power of meat and fat obtainable from livestock and poultry to thereby improve the quality of the meat and to modify the fat. In order to attain this object, according to the present invention, particular spices are fed to livestock and poultry from which their meat and fat are obtained.

Spices as referred to herein mean those in a broad sense, including both substantially aromatic herbs which are produced essentially in the districts along the shore of the Mediterranean and aromatic and hot spices which are produced in the tropics and the sub-tropics. Known intrinsic functions of these spices essentially include an appetite-increasing effect due to their aroma and stimulative hot, a masking effect against offensive odors of fish and meat due to the chemical activity and the aroma of the components contained in these spices, a scenting effect due to their aroma and, additionally, a coloring effect due to the dyes intrinsically existing in these spices. Some spices have, apart from their aroma and hot mentioned above, other effects such as an antiseptic effect, a physiological and pharmaceutical effect, etc. Perceiving the freshness-keeping effect of spices, we, the present inventors have completed the present invention, which is directed to the use of spices for feeding livestock and poultry thereby to increase the freshness-keeping power of the meat and fat to be obtained from livestock and poultry thus fed with such spices and to improve their smell and taste.

The spices to be used in the present invention are selected from the group consisting of the families Myristicaceae, Cruciferae, Rutaceae, Compositae, Pedaliaceae, Piperaceae, Leguminosae, Umbelliferae, Myrtaceae, Solanaceae, Labiatae, Lauraceae, Liliaceae and Zingiberaceae.

Specific examples of these spices include nutmeg, mace, mustard, Japanese pepper, tarragon, sesame, black pepper, white pepper, fenugreek, anise seeds, celery seeds, caraway, coriander, cumin, fennel, dill, parsley, paprika, clove, allspice, red chile, marjoram, rosemary, oregano, sage, thyme, laurel, basil, savory, bay leaf, cinnamon, onion, turmeric, cardamom and ginger.

According to the present invention, one or more chosen from among the above-mentioned various spices are used singly or in combination of them.

Feeding livestock and poultry with the above-mentioned spices, the quality of the meat and fat to be obtained from these livestock and poultry thus fed with them may be improved. To feed livestock and poultry with such spices, the spices may directly be given to them but, in order that livestock and poultry may easily take such spices, the spices may be added to feed. In the latter case, the base feed to which the spices are to be added is not specifically limited but may be any ordinary feed for livestock and poultry. For instance, in addition to the above-mentioned spices to be added thereto, the feed may contain grains such as corn, milo, barley, wheat, etc., vegetable refuses, such as soybean refuse, rapeseed refuse, cotton seed refuse, sesame refuse, etc., animal origin feed such as fish powder, meat born powder, etc., and other components such as animal oils and fats, calcium carbonate, calcium phosphate, salt, isomaltooligosaccharide syrup, silicic anhydride, cells of *Bacillus toyoii*, various vitamins, minerals, amino acids, etc. The proportion of the spices to be added to feed is preferably 10 ppm or more relative to the feed. If the proportion of the spices to be added to feed is less than the range, the intended effect is difficult to obtain. The other feeding conditions are not specifically defined but may be any ordinary ones when livestock and poultry are fed according to the present invention, provided that they are fed with the above-mentioned spices.

According to the present invention, livestock and poultry take the above-mentioned spices with the result that the active ingredients in the spices that haven been taken into the bodies of livestock and poultry are moved to the internal fat in them. Accordingly, the quality of the meat to be obtained from them and the smell of the fat also to be obtained from them are improved. As a result, meat and fat having no offensive fat odor but having an increased freshness-keeping power may be obtained from the livestock and poultry thus fed with the spices according to the present invention. Even though livestock and poultry are fed with the spices, the smell and taste intrinsic to the spices do not transfer to the meat and fat from them. The spices may be added to feed with which livestock and poultry are fed. In this way, livestock and poultry may take the spices efficiently with ease.

The functions of the particular spices to be employed in the present invention are considered as follows: In general, spices contain a lot of anti-oxidative phenol derivatives, enol derivatives, sulfur compounds and heterocyclic compounds. These compounds will inhibit physical oxidation and biochemical oxidation with enzyme, etc., for example, the radical reaction in superoxidation of lipid, displaying their anti-oxidative effect. However, even though spices are fed to livestock and poultry, all the above-mentioned components in the spices that have been taken into their bodies are not always kept in them as they are and, in addition, the anti-oxidative effect of such components are not always expressed in their bodies, as depending on the internal mechanisms, such as absorption, metabolism, etc., of livestock and poultry. However, when the particular spices to be employed in the present invention are fed to livestock and poultry and are taken into their bodies, at least some of the above-mentioned anti-oxidative components are not metabolized but are kept in their bodies as they are with the result that the components that have been kept in the meat and fat from the livestock and poultry will display their activity in the meat and fat from them.

The mechanism of lowering the freshness of raw meat is generally considered as follows: The pattern of the change in meat after death of livestock and poultry comprises death→cadaveric rigidity→dissolution of rigidity (softening of meat)→autophagy→lowering of freshness→decay. ATP (adenosine triphosphate) in high-energy compounds is decomposed to uric acid, according to the decomposition route of ATP→ADP (adenosine diphosphate)→AMP (adenosine monophosphate)→IMP (inosinic acid)→HxR (inosine)→Hx (hypoxanthine). These decomposition reactions depend on the related enzymes. Recently, the freshness of meat is essentially represented by a biochemical "K value" but not by the degree of bacterial decay, as the former agrees with the empirical fact. The K value is represented by:

$$K(\%)=[(HxR+Hx)/(ATP+ADP+AMP+IMP+HxR+Hx)]\times 100$$

For instance, it is reported that the K value of commercial chicken falls within the range of from 5% to 97% and is 44% on average. In livestock and poultry fed with feed containing the spices of the present invention, it is considered that the components in the spices will have an influence on the enzymatic activity during the decomposition process from ATP to Hx to thereby improve the freshness-keeping power of meat from livestock and poultry.

DETAILED DESCRIPTION OF THE PREFERRED EMBODIMENT (EXAMPLE 1, COMPARATIVE EXAMPLE 1)

Variations in POV (peroxide value), TBA (thiobarbituric acid value) or AV (acid value) of the internal fat of broilers that had been fed with feed containing the spice of the present invention (see below) (Example 1) and those of the internal fat of broilers that had been fed with ordinary feed not containing the same (Comparative Example 1) were measured at intervals. On the basis of the thus-measured values, the improvement in the anti-oxidative property and the acid-value-elevation inhibiting power of the fat was evaluated.

Formulation of Feed: As shown in Table 1 below.

TABLE 1

| Group of Raw Material | Name of Ingredient | Example 1 | Comparative Example 1 |
|---|---|---|---|
| Grains | Corn, Milo, Cassava meal | 66.9% | 67% |
| Vegetable Refuse | Soybean refuse, Rapeseed refuse, Corn gluten meal | 18% | 18% |
| Animal Origin Feed | Fish powder, Meat bone powder, Feather meal | 10% | 10% |
| Others | Animal fats and oils, Calcium carbonate, Salt, Isomalto-oligo-saccharide syrup, Silicic anhydride, Cells of *Bacillus toyoii*, Calcium phosphate | 5% | 5% |
| Spice | See Table 2 | 0.1% | — |

(% means by % by weight.)

The spices to be in Table 1 above are as follows:

TABLE 2

| Feed No. | Spice |
|---|---|
| 1 | nutmeg |
| 2 | Japanese pepper |
| 3 | tarragon |
| 4 | red chile |
| 5 | marjoram |
| 6 | rosemary |
| 7 | sage |
| 8 | thyme |
| 9 | basil |
| 10 | onion |
| 11 | turmeric |
| 12 | mace |
| 13 | mustard |
| 14 | fenugreek |
| 15 | anise seeds |
| 16 | celery seeds |
| 17 | caraway |
| 18 | cumin |
| 19 | fennel |
| 20 | parsley |
| 21 | paprika |
| 22 | clove |
| 23 | allspice |
| 24 | laurel |
| 25 | oregano |
| 26 | cinnamon |
| 27 | ginger |

*) These spices are all dry grained products

Feeding Conditions
(1) Number of broilers fed: 10
(2) Period: From 0 to 18th days, fed with feed containing no spice
From 19th to 58th days, fed with feed containing the indicated spice (only in Example 1)

Test Methods

To determine POV and AV, the internal fat from the broilers thus fed under the above-mentioned conditions was stored at 40° C. for 7 days and was tested according to the standard indicated by Handbook for Fat-and-Oil Chemistry (edited by Nippon Fat-and-Oil Chemistry Association). To determine TBA, 2 g of the internal fat from the broilers were put in a phosphate buffer and homogenized therein, and a TBA reagent was added thereto and hated in a boiling bath for 30 minutes. Butanol and salt were added thereto, and the resulting mixture was centrifuged. The absorbance of the thus-separated butanol layer at 532 nm was measured.

Test Results
    As shown in Table 3.

TABLE 3

| Sample No. | POV (meq/kg) | TBA (nmol/g) | AV (meq/kg) |
| --- | --- | --- | --- |
| 1 | 28 | 14 | 14 |
| 2 | 31 | — | 15 |
| 3 | 30 | — | 12 |
| 4 | — | 18 | — |
| 5 | 29 | — | 18 |
| 6 | 32 | — | 13 |
| 7 | 12 | 9 | 12 |
| 8 | — | 35 | — |
| 9 | 14 | — | 16 |
| 10 | — | 24 | 18 |
| 11 | — | 43 | — |
| 12 | 35 | 6 | — |
| 13 | 33 | — | 15 |
| 14 | 32 | — | 16 |
| 15 | 46 | — | 18 |
| 16 | 43 | — | 15 |
| 17 | 48 | — | 14 |
| 18 | 50 | — | 15 |
| 19 | 33 | — | 14 |
| 20 | — | 130 | — |
| 21 | 49 | — | 19 |
| 22 | — | 110 | — |
| 23 | — | 93 | — |
| 24 | 31 | — | 18 |
| 25 | 30 | — | — |
| 26 | 33 | — | — |
| 27 | 40 | — | — |
| Comparative Example | 136 | 330 | 29 |

As is obvious from the results in Table 3 above, POV, TBA and AV of the fat obtained from the broilers fed with the feed of the present invention containing the indicated spice (Feed Nos. 1 to 27) were all lower than those of the fat obtained from the broilers fed with the comparative feed containing no feed. From the fact, it is understood that the anti-oxidative property of the fat obtained from the broilers fed with the spices is enhanced and that the spices are effective in inhibiting the elevation of the acid value of the fat.

EXAMPLES 2 TO 23, COMPARATIVE
EXAMPLES 2 TO 23)

The chicken meat of the broilers that had been fed with feed containing the spice of the present invention (see below) and that of the broilers that had been fed with ordinary feed not containing the same were subjected to a sensual test to determine their smell and taste. In addition, their K values were measured. On the basis of the results of the sensual test and the thus-measured values, the improvement in the oily smell and the taste of the meat and the improvement in the freshness-keeping power of the meat were evaluated.

Formulation of Feed: As shown in Table 4 below.

TABLE 4

| Group of Raw Material | Name of Ingredient | Example 2~23 | Comparative Example 2~23 |
| --- | --- | --- | --- |
| Grains | Corn, Milo, Cassava meal | 66.9% | 67% |
| Vegetable Refuse | Soybean refuse, Rapeseed refuse, Corn gluten meal | 18% | 18% |
| Animal Origin Feed | Fish powder, Meat bone powder, Feather meal | 10% | 10% |
| Others | Animal fats and oils, Calcium carbonate, Salt, Isomalto-oligo-saccharide | 5% | 5% |

TABLE 4-continued

| Group of Raw Material | Name of Ingredient | Example 2~23 | Comparative Example 2~23 |
| --- | --- | --- | --- |
| | syrup, Silicic anhydride, Cells of Bacillus toyoii, Calcium phosphate | | |
| Spice | See Table 5 | 0.1% | — |

(% means by % by weight.)

The spices to be in Table 4 above are as follows:

TABLE 5

| Example 2 | nutmeg |
| --- | --- |
| Example 3 | mace |
| Example 4 | Japanese pepper |
| Example 5 | tarragon |
| Example 6 | clove |
| Example 7 | red chile |
| Example 8 | allspice |
| Example 9 | parsley |
| Example 10 | marjoram |
| Example 11 | rosemary |
| Example 12 | sage |
| Example 13 | basil |
| Example 14 | onion |
| Example 15 | cinnamon |
| Example 16 | oregano |
| Example 17 | mustard/clove/mace/marjoram = 1/1/1/1, by weight - the same shall apply hereunder. |
| Example 18 | Japanese pepper/parsley = 1/1 |
| Example 19 | tarragon/sage/red chile = 1/1/1 |
| Example 20 | allspice/onion = 1/1 |
| Example 21 | nutmeg/thyme/caraway/paprika = 1/1/1/1 |
| Example 22 | rosemary/cinnamon = 1/1 |
| Example 23 | basil/giner = 1/1 |

*) These spices are all dry grained products
Feeding Conditions
    (1) Number of broilers fed: 10
    (2) Period: From 0 to 18th days, fed with feed containing no spice
    From 19th to 58th days, fed with feed containing the indicated spice (only in Examples)
Test Methods and Test Results
    1. Sensual Test
    The smell and taste of the dark meat from the broilers thus fed under the above-mentioned conditions were evaluated.
    Tested samples: Dark meat (from the thigh of chicken)
    Test method: The dark meat obtained from each of the broilers fed with the feed of each Example or each Comparative Example was packed in vacuum. All the vacuum pack samples were boiled in the same pan for 30 minutes. The meats taken out from the packs were pulverized with hands to suitable sizes, and their smell and taste were evaluated organoleptically, individually.
    Method and criteria for evaluation:
    (1) Evaluation of smell and taste:
    22 panelists (14 women and 8 men) tested the dark meat samples with respect to the following three matters:
        (a) Smell of the samples, when they ate them.
        (b) Taste of the samples, when they ate them.
        (c) Total evaluation.
    The samples were evaluated by 5-rank evaluation ranging from "−1", "−1", "0", "+1" and "+2", based on the rank of the comparative samples of being "0".
    (2) Evaluation of panelists' preference:
    22 panelists (14 women and 8 men) tested the dark meat samples with respect to their likes as to whether the sample was good or bad, based on the comparative samples.

Test results:

The results of the above-mentioned sensual test for the smell, the taste and the panelists' preference are shown in Table 6 below.

TABLE 6

Results of Sensual Test

| | Evaluation of smell and taste | | | Evaluation of panelists' preference | |
|---|---|---|---|---|---|
| | (a) | (b) | (c) total evaluation | | |
| | smell | taste | ation | good | bad |
| Example 1 | +0.79 | +0.71 | +0.79 | 17* | 5* |
| Example 2 | +0.12 | +0.33 | +0.24 | 14 | 8 |
| Example 4 | +0.40 | +0.60 | +0.50 | 14 | 8 |
| Example 5 | +0.12 | +0.30 | +0.25 | 14 | 8 |
| Example 6 | +0.17 | +0.53 | +0.23 | 15 | 7 |
| Example 7 | +0.30 | +0.60 | +0.25 | 16 | 6 |
| Example 8 | +0.19 | +0.80 | +0.60 | 17 | 5 |
| Example 9 | +0.40 | +0.30 | +0.13 | 14 | 8 |
| Example 10 | +0.50 | +0.20 | +0.26 | 14 | 8 |
| Example 11 | +0.29 | +0.50 | +0.36 | 16 | 6 |
| Example 12 | +0.50 | +0.42 | +0.25 | 14 | 8 |
| Example 13 | +0.40 | +0.70 | +0.60 | 14 | 8 |
| Example 14 | +0.80 | +0.90 | +1.10 | 19 | 3 |
| Example 15 | +0.50 | +0.40 | +0.43 | 16 | 6 |
| Example 16 | +0.45 | +0.33 | +0.45 | 17 | 5 |
| Example 17 | +0.75 | +1.00 | +0.63 | 14 | 8 |
| Example 18 | +0.50 | +0.65 | +0.50 | 15 | 7 |
| Example 19 | +0.55 | +0.60 | +0.30 | 16 | 6 |
| Example 20 | +0.80 | +0.93 | +1.00 | 19 | 3 |
| Example 21 | +0.83 | +0.83 | +0.90 | 18 | 4 |
| Example 22 | +0.55 | +0.40 | +0.50 | 17 | 5 |
| Example 23 | +0.45 | +0.70 | +0.65 | 15 | 7 |

*panelists

The above-mentioned results gave significant difference between the chicken meat from the broilers fed with the spice-containing feed of the present invention and the chicken meat from those fed with the spice-free ordinary feed in their smell and taste and in the panelists preference for them.

2. Determination of Freshness of Meat

Test Method:

The meats from the broilers each fed with one of the feed samples of Examples 2 to 23 and Comparative Examples 2 to 23 were stored at 0° C., and the time-dependent variation in the K value of each of the thus-stored meats was determined by high performance liquid chromatography at regular intervals.

Test Results:

As shown in Table 7 below.

TABLE 7

| K Value of Stored Meat | | | |
|---|---|---|---|
| Example No. | 0 day | 4 days | 7 days |
| Example 2 | 17% | 39% | 52% |
| Comparative Example 2 | 28% | 50% | 61% |
| Example 3 | 14% | 45% | 57% |
| Comparative Example 3 | 20% | 50% | 60% |
| Example 4 | 19% | 48% | 58% |
| Comparative Example 4 | 20% | 50% | 60% |
| Example 5 | 14% | 45% | 57% |
| Comparative Example 5 | 20% | 50% | 60% |
| Example 6 | 16% | 43% | 57% |
| Comparative Example 6 | 20% | 50% | 60% |
| Example 7 | 23% | 45% | 57% |
| Comparative Example 7 | 27% | 50% | 60% |
| Example 8 | 17% | 45% | 57% |

TABLE 7-continued

| K Value of Stored Meat | | | |
|---|---|---|---|
| Example No. | 0 day | 4 days | 7 days |
| Comparative Example 8 | 27% | 50% | 60% |
| Example 9 | 22% | 46% | 57% |
| Comparative Example 9 | 28% | 51% | 61% |
| Example 10 | 14% | 45% | 55% |
| Comparative Example 10 | 20% | 50% | 60% |
| Example 11 | 26% | 48% | 58% |
| Comparative Example 11 | 34% | 53% | 62% |
| Example 12 | 26% | 50% | 58% |
| Comparative Example 12 | 34% | 53% | 62% |
| Example 13 | 15% | 42% | 55% |
| Comparative Example 13 | 20% | 50% | 60% |
| Example 14 | 16% | 43% | 57% |
| Comparative Example 14 | 16% | 43% | 57% |
| Example 15 | 14% | 41% | 50% |
| Comparative Example 15 | 20% | 50% | 60% |
| Example 16 | 15% | 43% | 52% |
| Comparative Example 16 | 20% | 50% | 60% |
| Example 17 | 15% | 43% | 52% |
| Comparative Example 17 | 15% | 48% | 58% |
| Example 18 | 17% | 44% | 55% |
| Comparative Example 18 | 20% | 50% | 60% |
| Example 19 | 26% | 45% | 53% |
| Comparative Example 19 | 34% | 53% | 62% |
| Example 20 | 27% | 44% | 54% |
| Comparative Example 20 | 34% | 53% | 62% |
| Example 21 | 15% | 42% | 52% |
| Comparative Example 21 | 20% | 50% | 60% |
| Example 22 | 26% | 44% | 53% |
| Comparative Example 22 | 34% | 53% | 62% |
| Example 23 | 27% | 45% | 55% |
| Comparative Example 23 | 34% | 53% | 62% |

The results obviously indicate the decrease in the K value of the meat from the broilers fed with the spice-containing feed of the present invention. From these, the freshness-keeping effect of the spice-containing feed of the present invention is obvious.

What is claimed is:

1. A method for improving freshness-keeping power of raw meat and fat from poultry consisting essentially of feeding poultry one or more spices from the families of plants selected from the group consisting of Myristicaceae, Cruciferae, Ruthaceae, Compositae, Pedaliaceae, Piperaceae, Leguminosae, Umbelliferae, Myrtaceae, Solanaceae, Labiatae, Lauraceae, Liliaceae and Zingiberaceae, and obtaining meat and fat from the poultry modified by said spices without transferring substantially smell and taste intrinsic to the spices to the raw meat and fat, wherein said meat and fat has a peroxide value (POV) of 50 or less, a thiobarbituric acid value (TBA) of 130 or less, and an acid value (AV) of 19 or less.

2. The method as claimed in claim 1, in which the spice is at least one chosen from the group consisting of nutmeg, mace, mustard, Japanese pepper, tarragon, sesame, black pepper, white pepper, fenugreek, anise seeds, celery seeds, caraway, coriander, cumin, fennel, dill, parsley, paprika, clove, allspice, red chile, marjoram, rosemary, oregano, sage, thyme, laurel, basil, savory, bay leaf, cinnamon, onion, turmeric, cardamom and ginger.

3. The method as claimed in claim 1 or 2, in which poultry are fed with feed to which the spice has been added.

4. The method as claimed in claim 3, in which the spice has been added to the feed in an amount of 10 ppm or more relative to the feed base.

5. The method as claimed in claim 1 or 2, in which the poultry are chickens.

6. The method as claimed in claim 1 or 2, in which the poultry are broilers.

* * * * *